United States Patent
White

(10) Patent No.: US 6,594,632 B1
(45) Date of Patent: Jul. 15, 2003

(54) METHODS AND APPARATUS FOR HANDS-FREE OPERATION OF A VOICE RECOGNITION SYSTEM

(75) Inventor: Daniel F. White, Lilburn, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/184,801

(22) Filed: Nov. 2, 1998

(51) Int. Cl.[7] ............................................. G10L 15/00
(52) U.S. Cl. ...................... 704/270; 704/275; 704/251; 704/246
(58) Field of Search ................................. 704/246, 251, 704/275, 270

(56) References Cited

U.S. PATENT DOCUMENTS

| | | | |
|---|---|---|---|
| 3,192,321 A | 6/1965 | Nassimbene | 179/1 |
| 3,671,673 A | 6/1972 | Uchida et al. | 179/1 VC |
| 4,296,277 A | 10/1981 | Daneffel | 179/1 VC |
| 4,811,399 A * | 3/1989 | Landell et al. | 704/246 |
| 4,975,960 A | 12/1990 | Petajan | 381/43 |
| 5,133,011 A * | 7/1992 | McKiel, Jr. | 704/276 |
| 5,165,095 A | 11/1992 | Borcherding | 379/88 |
| 5,293,452 A | 3/1994 | Picone et al. | 395/2.59 |
| 5,313,556 A | 5/1994 | Parra | 395/2.55 |
| 5,323,470 A | 6/1994 | Kara et al. | 382/1 |
| 5,406,618 A * | 4/1995 | Knuth et al. | 379/67 |
| 5,420,912 A | 5/1995 | Kopp et al. | 379/63 |
| 5,493,618 A * | 2/1996 | Stevens et al. | 381/110 |
| 5,540,589 A | 7/1996 | Waters | 434/156 |
| 5,544,050 A | 8/1996 | Abe et al. | 364/419.13 |
| 5,562,453 A * | 10/1996 | Wen | 434/185 |
| 5,603,065 A | 2/1997 | Baneth | 395/893 |
| 5,680,505 A | 10/1997 | Ho | 395/2.6 |
| 5,719,921 A | 2/1998 | Vysotsky et al. | 379/88 |
| 5,749,324 A * | 5/1998 | Moore | 119/719 |
| 5,764,852 A * | 6/1998 | Williams | 704/246 |
| 5,802,467 A * | 9/1998 | Salazar et al. | 455/420 |
| 5,839,104 A * | 11/1998 | Miller et al. | 704/251 |
| 5,926,090 A * | 7/1999 | Taylor et al. | 340/568.1 |
| 5,983,186 A * | 11/1999 | Miyazawa et al. | 704/275 |
| 6,023,676 A * | 2/2000 | Erell | 704/241 |

\* cited by examiner

Primary Examiner—Daniel Abebe
(74) Attorney, Agent, or Firm—Priest & Goldstein, PLLC

(57) ABSTRACT

Techniques for activating a voice recognition system are described. The system disclosed can be non verbally started and stopped without the need for the system user to use his or her hands facilitating hands-free operation in an environment with a relatively high degree of ambient background verbal noise. For example, a user may start the voice recognition system by blowing once on a microphone and stop the system by blowing twice on a microphone. The user may alternately start and stop the system by using other nonverbal inputs such as facial expressions, clearing the throat or moving one's head. Such other nonverbal inputs may be detected by pressure sensors or motion sensors. The operational state of the system may alternately be toggled from off to on, or from on to off, with each subsequent nonverbal input.

19 Claims, 4 Drawing Sheets

US 6,594,632 B1

METHODS AND APPARATUS FOR HANDS-FREE OPERATION OF A VOICE RECOGNITION SYSTEM

FIELD OF THE INVENTION

The present invention relates generally to voice recognition systems, and in particular to improvements in the use of such systems in an environment where hands-free operation is desirable, such as a retail checkout station. The invention relates to advantageous methods of turning a voice recognition system on and off without the need for the system operator to use their hands to push a button or click a mouse, or to issue specific voice commands. The methods and apparatus described in further detail below are well suited to noisy environments where a traditional voice recognition system would have difficulty ascertaining the operator's voice from background noise, and prevent the system from being accidentally activated by a person other than the operator.

BACKGROUND OF THE INVENTION

Retailers have traditionally used a variety of methods to automate the retail customer transaction process. The desire to automate this process is driven by the competing goals of completing the transaction quickly and accurately, while providing the customer with a positive shopping experience and gathering increasing amounts of information about the transaction and the customer.

Retail grocers have been the most progressive type of retailer in regard to automating the checkout process. The near universal implementation of product package barcoding by product manufacturers, and barcode scanning by retailers, has been essential to the implementation of the automation process. One significant problem that remains is the impact that unlabeled products, or otherwise unscannable products, have on the automation of the checkout process. This problem is further compounded by the lack of training and relatively low skill level of cashiers due to rapid employee turnover and other factors. Among the most common reasons for an item being unscannable are that the barcode is damaged or of insufficient quality, the item is not found in the POS system price look-up (PLU) file, or the product package is not barcoded. When a cashier encounters a product that is unscannable, the cashier must typically stop the scanning process and manually take some action to identify the item. If the item has a barcode, but the item does not scan, the operator may try typing the Universal Product Code (UPC) number on the package. If the item consists of unlabeled bulk goods or produce, the operator may consult a paper list to find the proper price look-up (PLU) number. If neither of the above actions is adequate or appropriate, the operator may call for assistance from another employee, enter a fictitious price or just give the item away.

The most common type of non-barcoded product in a grocery store is produce. Although many grocers have implemented the practice of labeling all produce with a PLU number printed on a sticker, individual pieces of produce often lose the sticker by the time the item reaches the cashier. The cashier will either enter a PLU from memory or consult a table of PLU numbers. It is common for cashiers to enter a PLU for a different, but similar, product merely to keep the checkout process moving quickly. This deprives the grocer of accurate sales and inventory replenishment data. Another common scanning problem occurs when the POS system does not find the item in the PLU file. In this case the cashier may ask the customer for the item price, or call for assistance from a supervisor or grocery bagger, resulting in a significant delay in completing the checkout process. If the customer provides the price, the retailer may be deprived of accurate data, and possibly revenue. If the cashier calls for assistance, customer satisfaction suffers while all of the customers in the line endure a delay. Lastly, if the barcode is damaged or otherwise unscannable, the cashier must manually enter the UPC number. If the UPC number is found in the PLU file, the checkout process proceeds with a nominal delay. If the item is not found, the cashier must call for assistance and the customer is delayed further. A cashier experiencing any of the above situations could utilize a voice recognition system to query the POS system for a PLU inquiry, or to voice certain product name or description information to be used in a search query. The problem to be solved, then, is to be able to activate the voice recognition system only when needed, and to do so while continuing to scan other items.

A similar set of problems are present in the food preparation industry. This includes, but is not limited to, the kitchens of a fine-dining restaurant, fast-food restaurant, or grocery store deli counter. Cooks and order takers in such an environment must use their hands to prepare meals or orders, and cannot work efficiently if they must stop their work to push a button or click a mouse to activate a voice recognition system. One major challenge for the kitchen of a fine-dining restaurant is to be able to complete all orders for a given table at the same time, and to notify the appropriate waiters that their orders are ready to be taken to the tables.

In a typical fast-food restaurant, the order takers enter orders into an order-entry computer system. The order-entry computer system then sends the kitchen portion of the order to a computer display in the kitchen. The cooks then remove orders from the kitchen display after they prepare the kitchen orders and 'bump' those orders back to the order fillers. The order fillers or order takers gather the non-kitchen portions of the order while the kitchen prepares the kitchen portion. When the kitchen items are 'bumped' back to the order fillers, the order fillers take the kitchen portion of the order and combine it with the non-kitchen portion. When the order is completely filled, the order filler delivers the order to the customer and 'bumps' the order out of the order-entry system. The 'bumps' are typically accomplished by using a bump-bar peripheral device attached to the order-entry system. Utilizing a typical bump-bar requires the order filler or cook to walk over to where the bump-bar is installed and physically push the bump-bar.

The clerks at a grocery store deli counter need to weigh or measure orders before printing a label that identifies and prices those orders. A typical counter will have a plurality of scales that may be used by any one of the clerks. A clerk typically needs to perform a number of tasks to complete an order. These tasks may include filling small containers from large bulk containers in a refrigerated case, cutting a loaf of bread on a bread slicer, and cutting meat products on a meat slicer. After each individual order item is prepared, the clerk must go to one of the scales to weigh the item and enter some identifying information before the scale can generate an appropriate label.

In each of the above situations, the clerks, cooks and order takers could advantageously utilize a voice recognition system to provide the required bumps or data inputs. Utilizing a voice recognition system that is activated in a hands-free manner would allow those workers to provide the necessary data inputs while they were completing their other required tasks.

SUMMARY OF THE INVENTION

The present invention recognizes that there exists a need in a variety of contexts for a hands-free method of starting and stopping a voice recognition system. Such a method should advantageously allow the starting and stopping of such a system without the use of specific spoken commands. Such a method should additionally operate irrespective of the type of ambient noise present where such a system is installed.

Methods and apparatus for operating a voice recognition system in a retail store, according to one aspect of the present invention, preferably include a means of starting and stopping the recognition process without the use of the operator's hands or feet, as well as a means for annunciating the status of the voice recognition process. One method described further below allows for starting and stopping the voice recognition system by blowing on a microphone. Alternate methods described below allow an operator to start and stop the voice recognition system by coughing, clearing the throat, moving the head or other parts of the body. In one embodiment of the present invention, the system may be started or stopped by blowing, coughing, or the like, once or twice respectively. Alternately, the state of the voice recognition process may be toggled between the 'started' and 'stopped' states by blowing, coughing, or the like, into a microphone or pressure sensor.

A more complete understanding of the present invention, as well as further features and advantages, will be apparent from the following Detailed Description and the accompanying drawings.

DETAILED DESCRIPTION

Figure 1:
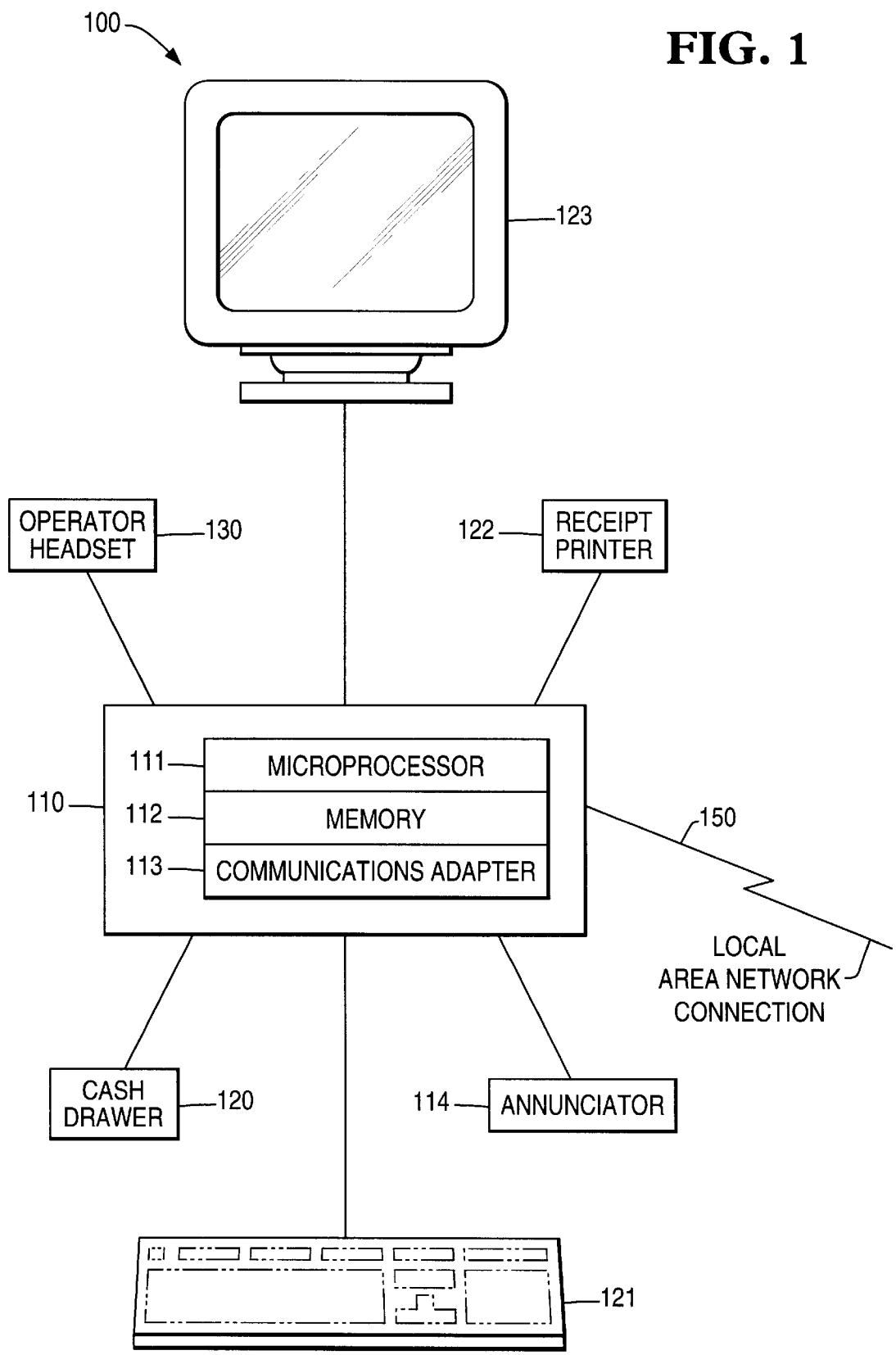
FIG. 1 illustrates a POS terminal suitable for use in conjunction with the present invention.

FIG. 1 illustrates a POS terminal 100 adapted for use in conjunction with the present invention as described further below. A base unit 110 includes a microprocessor 111, memory 112 and a communications adapter 113. The POS terminal 100 communicates with other computers via the communications adapter 113 via a local area network connection 150. Peripheral input and output devices are connected to the base unit 110 including an operator keyboard 121, an operator display 123, a cash drawer 120, a receipt printer 122 and an annunciator 114. Annunciator 114 may be a beeper, speaker, lighted indicator, or some combination thereof, and may alternately be incorporated into base unit 110. An operator headset 130 is also connected to the base unit.

The POS terminal 100 is adapted for use in conjunction with the present invention by utilizing the microprocessor 111 in conjunction with a software program stored in the memory 112 to analyze input signals from the operator headset 130.

Figure 1A:
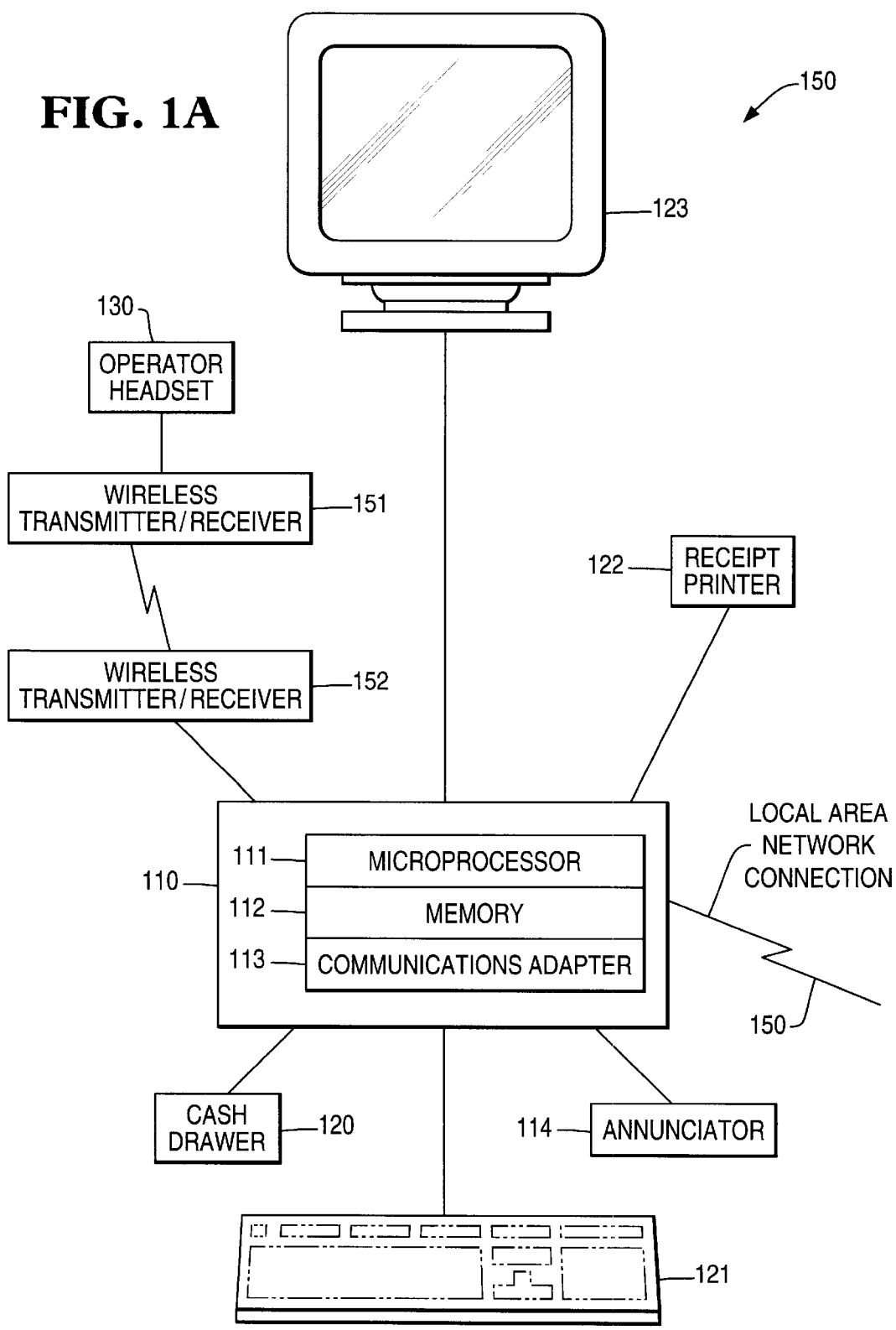
FIG. 1a illustrates an alternative POS terminal for use in conjunction with the present invention.

The connection between the operator headset 130 and the POS terminal base unit 110 may be a direct wired connection as illustrated in FIG. 1. A typical alternate connection between the operator headset 130 and the POS terminal base unit 110 is illustrated in FIG. 1a. The operator headset 130 is connected to the wireless transmitter/receiver 151 by a wired connection. The wireless transmitter/receiver 152 is connected to the POS terminal base unit 110 by a wired connection. The wireless transmitter/receiver 151 communicates with the wireless transmitter/receiver 152 via a radio frequency, infrared, or other common wireless communication link, allowing a wearer of the headset 130 to move freely within the range of the link.

Figure 2:
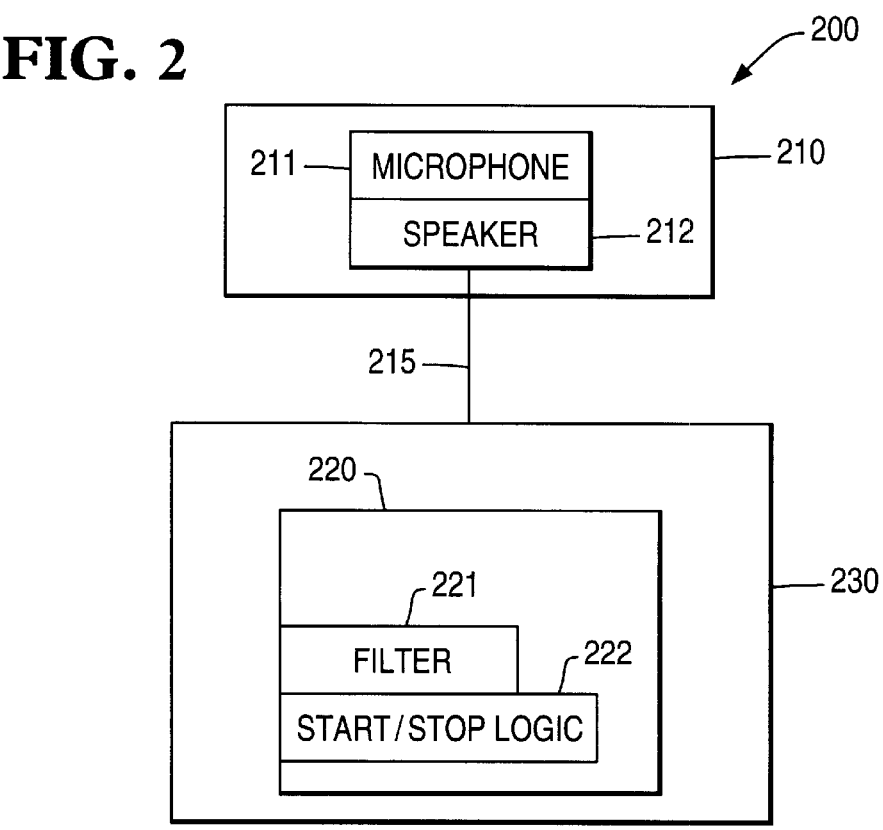
FIG. 2 illustrates a headset and a headset adapter for implementing one embodiment of the present invention.

FIG. 2 illustrates an apparatus 200 for use in implementing the present invention. An operator headset 210 is connected via connection 215 to a headset adapter 220 installed in a computer 230 such as the base unit 110 of the POS terminal 100 as illustrated in FIG. 1. The connection 215 may be a direct wired connection as illustrated in FIG. 1 or it may include a wireless communication link as illustrated in FIG. 1a. The operator headset 210 minimally consists of a microphone 211 and may include one or more speakers 212. The connection 215 allows audio signals to pass from microphone 211 to the headset adapter 220, and for audio signals to pass from the headset adapter 220 to the optional speaker or speakers 212. The headset adapter 220 includes filter 221 and start/stop logic 222.

The filter 221 is designed with a passband to pass only those frequencies that represent the nonverbal start and stop signals. These start and stop signals are passed to start/stop logic 222, which in turn signal the voice recognition system software to respectively start and stop accepting audio inputs from operator headset 210. In one embodiment of the present invention, filter 221 is designed to pass certain frequencies that represent nonverbal sounds, such as blowing, coughing, clucking or the like. Filter 221 may include a sampling function to be utilized in a training mode wherein background ambient noise may be sampled and measured, a minimum and maximum input threshold level may be determined, and a frequency map for the desired start and stop sounds, and the like, for a given operator, may be stored. This training mode may be initiated each time an operator uses the system or it may be initiated once for each of the operators that may use the system. This training mode may alternately be accomplished by the voice recognition system software, and the appropriate parameters then utilized to initialize filter 221. While FIG. 2 illustrates a separate hardware filter, a software implementation may also be employed.

Figure 2A:
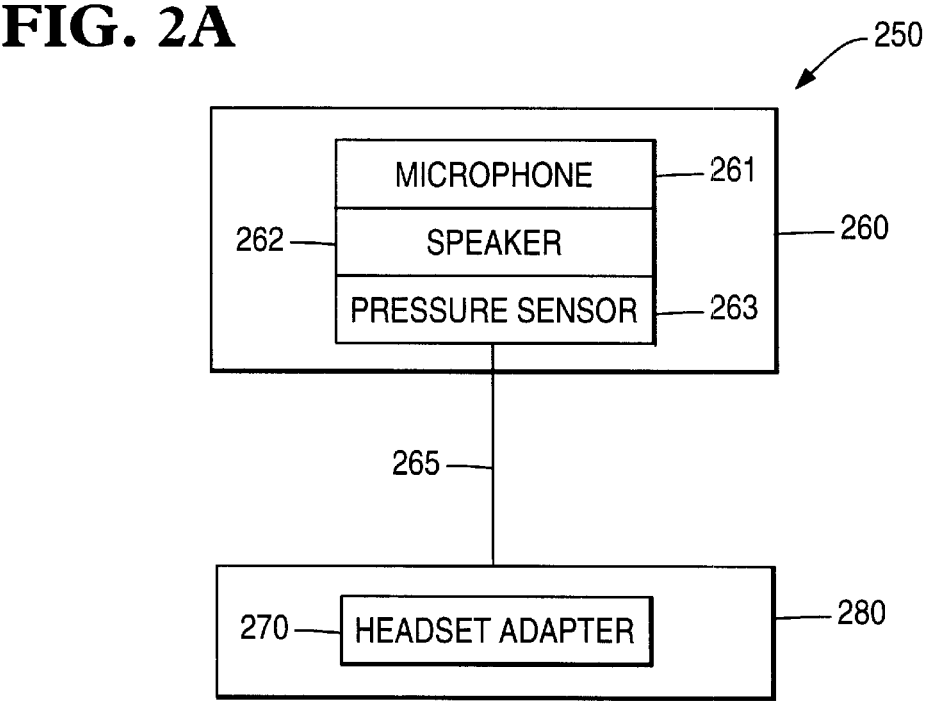
FIG. 2a illustrates an alternate headset and headset adapter for implementing another embodiment of the present invention.

FIG. 2a illustrates an apparatus 250 for use in implementing an alternate embodiment of the present invention. An operator headset 260 is connected via connection 265 to a headset adapter 270 installed in a computer 280 such as the base unit 110 of the POS terminal 100 as illustrated in FIG. 1. The connection 265 may be a direct wired connection as illustrated in FIG. 1 or it may include a wireless communication link as illustrated in FIG. 1a. The operator headset 260 minimally consists of a microphone 261, a pressure sensor 263 and may include one or more speakers 262. The connection 265 allows audio signals to pass from microphone 261 to the headset adapter 270, and for audio signals to pass from the headset adapter 270 to the optional speaker or speakers 262. The headset adapter 270 separates the audio signals from microphone 261 from the start and stop command signals from pressure sensor 263. These start and stop signals are passed to the voice recognition system software, commanding the voice recognition system to respectively start and stop accepting audio inputs from operator headset 260.

In one embodiment of the present invention, pressure sensor 263 is collocated with microphone 261. Pressure sensor 263 is designed to detect the vocal pressure corresponding to a known, nonverbal start or stop command. Pressure sensor 263 may include a sampling function to be utilized in a training mode wherein background ambient noise sound pressure may be sampled and measured, and a minimum and maximum input threshold level may be determined and stored. This training mode may be initiated each time an operator uses the system or it may be initiated once for each of the operators that may use the system. This training mode may alternately be accomplished by the voice recognition system software, and the appropriate parameters then utilized in conjunction with pressure sensor 263.

In another embodiment of the present invention, pressure sensor 263 is designed to detect facial movements or expressions such as moving the jaw, raising an eyebrow or pressing a cheek against the sensor. In this embodiment, pressure sensor 263 is not collocated with microphone 261. Instead, pressure sensor 263 is incorporated into operator headset 260 in such a way as to allow it to be placed in contact with the operator's jaw, cheek, or the like.

Figure 3:
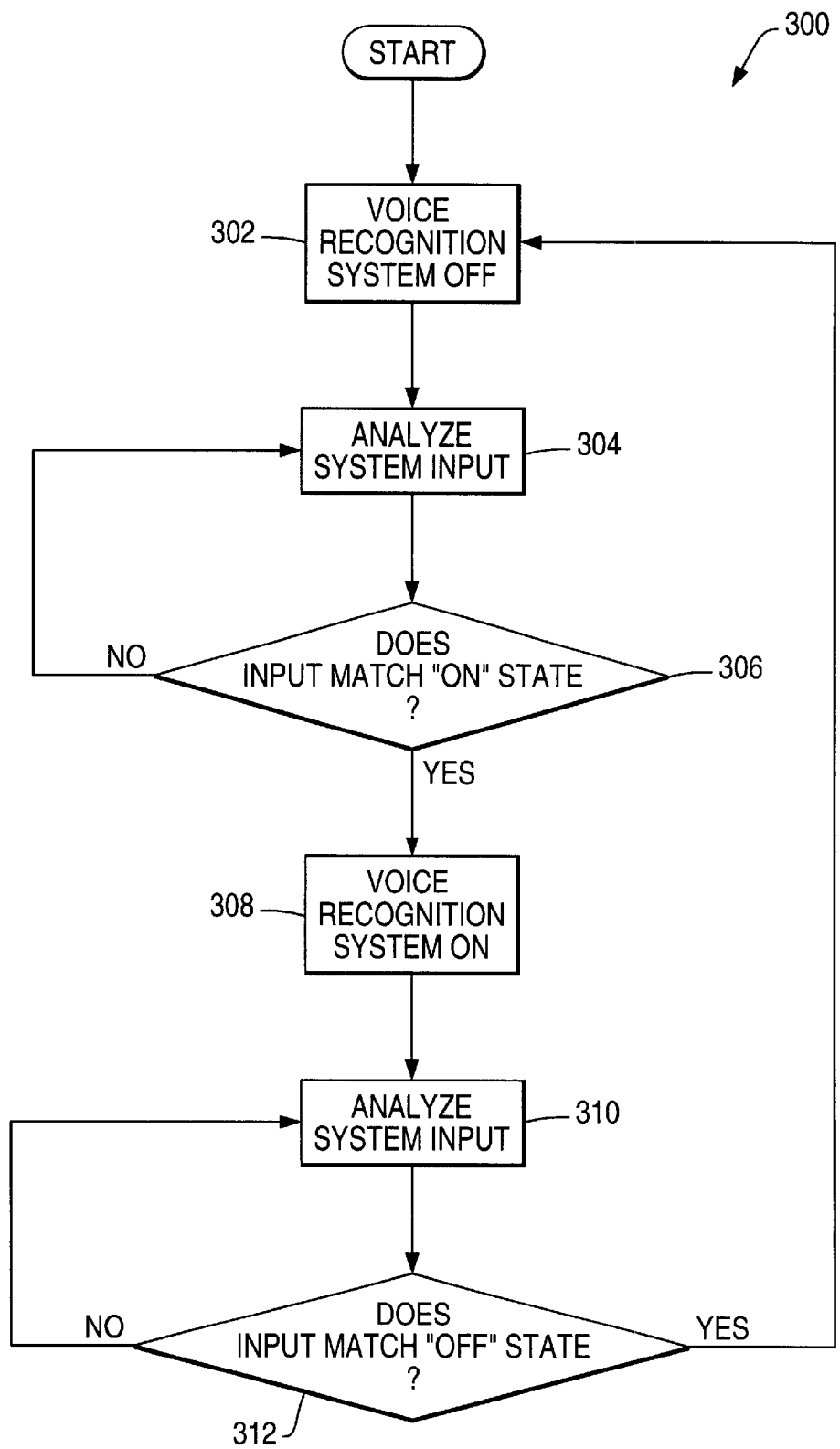
FIG. 3 illustrates a process for monitoring a microphone and determining when to switch a voice recognition system on or off in accordance with the present invention.

FIG. 3 illustrates a procedure 300 for determining when to switch a voice recognition system on and off in accordance with one aspect of the present invention. The process begins at process step 302 with the voice recognition system switched off. At step 304, the process monitors and analyzes system input signals. At step 306, it is determined if the input signal matches the criteria for switching the voice recognition system on. If the input signal does not match the criteria for switching the voice recognition system on, the process loops back to step 304. If the input signal does match the criteria for switching the voice recognition system on, the process proceeds to step 308 and the voice recognition system is switched on. The process then proceeds to step 310 where the process monitors and analyzes further system input signals. At step 312, the process determines if the input signal matches the criteria for switching the voice recognition system off. If the input signal does not match the criteria for switching the voice recognition system off, the process loops back to step 308. If the input signal does match the criteria for switching the voice recognition system off, the process proceeds to loop back to step 302 and the voice recognition system is switched off.

In one aspect of the present invention, a method for calibrating an apparatus for controlling the operation of a voice recognition system comprises the steps of measuring the volume and frequency content of the ambient background noise from a microphone to generate a first calibration signal; measuring the volume and frequency of nonverbal voice signals from a microphone to generate second and third calibration signals, said voice signals representing start and stop commands for use with the voice recognition system; and modifying the volume and frequency response of a filter to correspond to the first, second and third calibration signals. Additionally the method may further comprise the step of determining minimum and maximum threshold volume levels by voicing nonverbal test signals into said microphone.

In another aspect of the present invention, a method for calibrating an apparatus for controlling the operation of a voice recognition system comprises the steps of measuring the volume and frequency content of the ambient background noise from a microphone to generate a first calibration signal; measuring the volume and frequency of a nonverbal voice signal from a microphone to generate a second calibration signal, said voice signal representing a toggle command for use with the voice recognition system; and modifying the volume and frequency response of a filter to correspond to the first and second calibration signals.

I claim:

1. A hands-free method for starting and stopping a voice recognition system, the method comprising the steps of:

storing in a computer memory a set of reference nonverbal voice signals, said nonverbal voice signals representing commands to start and stop a voice recognition system;

reading into a computer memory a signal from a microphone;

comparing said signal from said microphone to said set of reference nonverbal voice signals;

sending start or stop commands to a voice recognition system if said signal from said microphone matches one of the set of said reference nonverbal voice signals; and starting and stopping the voice recognition system based upon the start and stop commands.

2. The method of claim 1 wherein said set of reference voice signals is comprised of:

a nonverbal voice signal representing the sound of blowing once into the microphone; and a nonverbal voice signal representing the sound of blowing twice into the microphone.

3. The method of claim 2 wherein said voice signal representing the sound of blowing once into the microphone generates a command to start the voice recognition system and the voice signal representing the sound of blowing twice into the microphone generates a command to stop a voice recognition system.

4. The method of claim 1 wherein said set of reference voice signals is comprised of a nonverbal voice signal representing the sound of clearing the throat once or twice.

5. The method of claim 4 wherein said voice signal representing the instance of once clearing the throat generates a command to start the voice recognition system and the instance of twice clearing the throat generates a command to stop the voice recognition system.

6. The method of claim 1 wherein said set of reference voice signals is comprised of voice signals representing the sound of clucking the tongue.

7. The method of claim 6 wherein said voice signal representing once clucking the tongue generates a command to start the voice recognition system and twice clucking the tongue generates a command to stop the voice recognition system.

8. A hands-free method for starting and stopping a voice recognition system, the method comprising the steps of:

storing in a computer memory a reference nonverbal voice signal, said reference nonverbal voice signal representing a command to toggle the operational state of a voice recognition system;

reading into a computer memory a voice signal from a microphone;

comparing said voice signal from said microphone to said reference nonverbal voice signal; and sending a toggle command to a voice recognition system if said voice signal from said microphone matches said reference nonverbal voice signal, said toggle command switching the voice recognition system to an active operational state if the voice recognition system is in an inactive operational state or to an inactive operational state if the voice recognition system is in an active operational state.

9. The method of claim 8 wherein said reference voice signal is comprised of a nonverbal voice signal representing the sound of blowing into the microphone.

10. The method of claim 8 wherein said reference voice signal is comprised of a nonverbal voice signal representing the sound of clearing the throat.

11. The method of claim 8 wherein said reference voice signal is comprised of a nonverbal voice signal representing the sound of clucking the tongue.

12. An apparatus for non verbally starting and stopping the operation of a voice recognition system, said apparatus comprising:

a microphone;

a filter for passing frequencies that represent nonverbal voice signals; and a logic circuit for controlling the operation of a voice recognition system, said logic circuit being operable to monitor the output of said filter and being further operable to determine when to issue start and stop commands to said voice recognition system based upon the output of the filter exceeding a predetermined threshold level and further based upon the output of the filter comprising nonverbal voice signals.

13. The apparatus of claim 12, further comprising an annunciator, said annunciator indicating the operational status of the voice recognition system.

14. The apparatus of claim 12, further comprising a headset, said headset comprised of said microphone and one or more speakers.

15. The apparatus of claim 12 wherein said filter and said logic circuit are contained on an adapter card for use with a POS terminal.

16. The apparatus of claim 15 wherein said filter is an analog-to-digital converter.

17. A method for calibrating an apparatus for controlling the operation of a voice recognition system, the method comprising the steps of:

measuring the volume and frequency content of the ambient background noise from a microphone to generate a first calibration signal;

measuring the volume and frequency of nonverbal voice signals from a microphone to generate second and third calibration signals, said nonverbal voice signals representing start and stop commands for use with the voice recognition system; and modifying the volume and frequency response of a filter to correspond to the first, second and third calibration signals.

18. The method of claim 17 further comprising the steps of:

determining minimum and maximum threshold volume levels by voicing nonverbal test signals into said microphone.

19. A method for calibrating an apparatus for controlling the operation of a voice recognition system, the method comprising the steps of:

measuring the volume and frequency content of the ambient background noise from a microphone to generate a first calibration signal;

measuring the volume and frequency of a nonverbal voice signal from a microphone to generate a second calibration signal, said nonverbal voice signal representing a toggle command for use with the voice recognition system; and modifying the volume and frequency response of a filter to correspond to the first and second calibration signals.

* * * * *